March 31, 1970   J. D. RIVERS   3,504,208
MAGNETIC TACHOMETER GENERATOR
Filed June 17, 1968   2 Sheets-Sheet 1
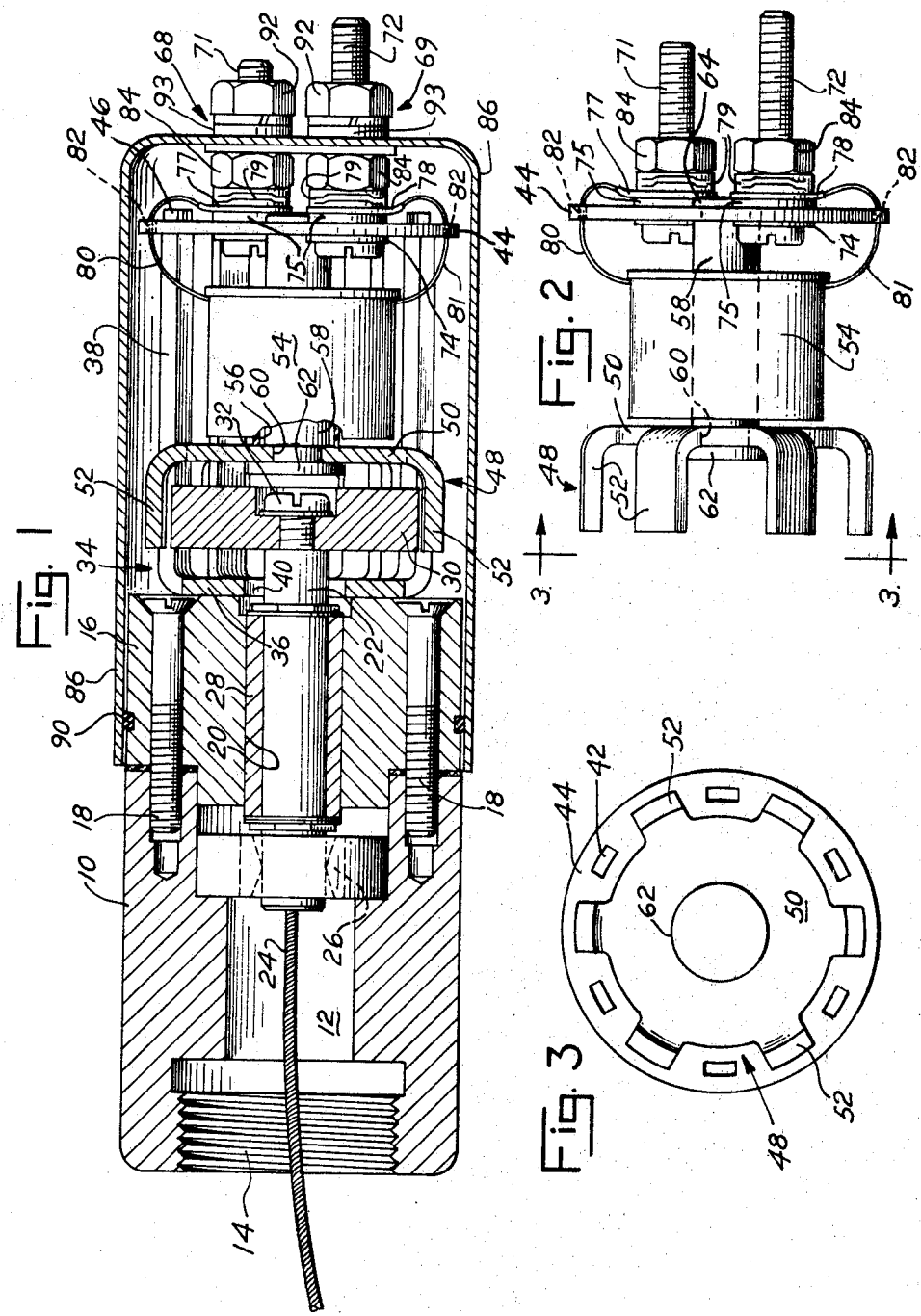
INVENTOR.
JOHN D. RIVERS
BY Bair, Freeman &
Molinare
ATTORNEYS March 31, 1970    J. D. RIVERS    3,504,208
MAGNETIC TACHOMETER GENERATOR
Filed June 17, 1968    2 Sheets-Sheet 2
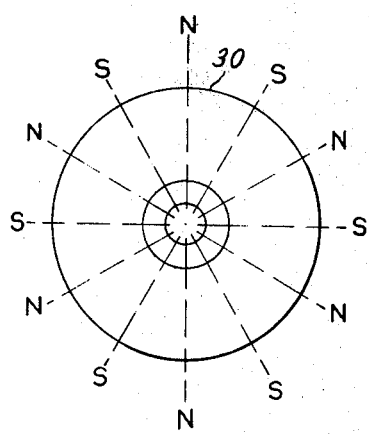
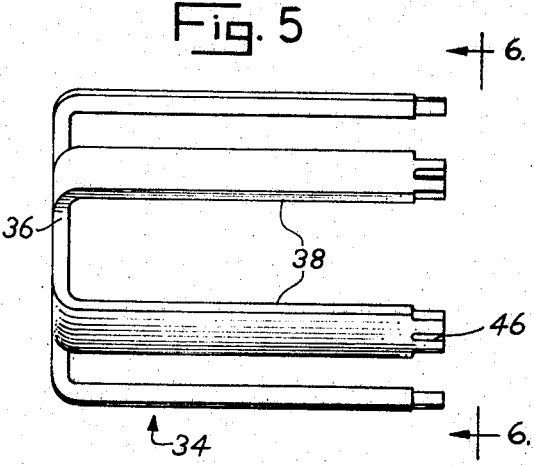
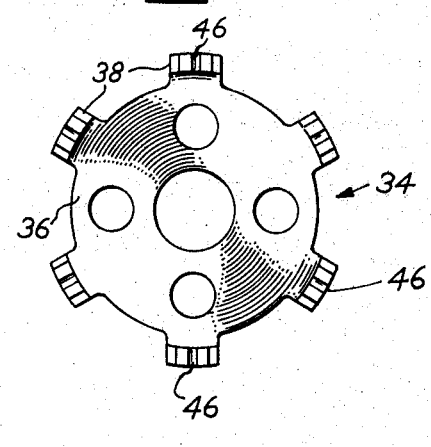
INVENTOR
JOHN D. RIVERS
BY Bair, Freeman &
Molinare
ATTORNEYS United States Patent Office 3,504,208
Patented Mar. 31, 1970

3,504,208
MAGNETIC TACHOMETER GENERATOR
John D. Rivers, Morton Grove, Ill., assignor to Sun Electric Corporation, a corporation of Delaware
Filed June 17, 1968, Ser. No. 737,445
Int. Cl. H02k 21/12; G01p 3/70
U.S. Cl. 310—156                                    2 Claims

ABSTRACT OF THE DISCLOSURE

A magnetic tachometer generator having a pair of stators, each of the stators including a base and a plurality of longitudinally extending fingers. The fingers of one stator extend between the fingers of the other stator and both stators' fingers enclose a rotor having a plurality of poles. The fingers of one stator are connected to a base plate and surround a coil which is located on a core mounted between the base plate and the base of the other stator. When the rotor is rotated by a machine, the speed of which is to be measured, an electrical signal, characterizing the machine speed, is induced in the coil, via the stators and the core, and the induced signal may be conducted through terminals to an indicating device.

BACKGROUND OF THE INVENTION

This invention relates to a magnetic generator and, more particularly, to a magnetic signal generating device for a tachometer or the like.

In the past tachometer generators have been provided for various machines, such as internal combustion engines, for measuring the rotation speed of the engine. These generators generally employ brush-type contacts in the course of producing a signal impulse for use in determining the speed of the engine. The brush contacts of the prior generators are susceptible to engine vibration, and where the engine speed is high, "point bounce" is frequently encountered. The brush contacts are also susceptible to contamination from oil, fuel or dirt resulting in erratic and faulty operation. Moreover, since the brushes are generally formed of a soft material, the prior generators require frequent servicing and replacement of the worn brushes. Also, many of the prior tachometer generators could only be rotated in one direction due to the presence of their brush contacts, rendering their use with reversible engines difficult.

A magnetic tachometer generator constructed in accordance with the principles of my invention is not subject to the aforementioned difficulties encountered with the prior tachometer generators. More particularly, such magnetic generator eliminates the use of contact points and is unaffected by contamination from oil, fuel, dirt or humidity. A most important advantage of my magnetic generator is that it obviates the problem of "point bounce" caused by the vibration and speed of the engine at high operating speeds. The magnetic tachometer generator, moreover, may be readily and easily used on engines which are reversible in operation and are operable at engine speeds ranging from 100 r.p.m. to speeds in excess of 6000 r.p.m. Further, the tachometer generator constructed in accordance with the principles of my invention is virtually unaffected by strong magnetic fields and is operable in temperature environments ranging from −55° C. to 105° C. Finally the magnetic tachometer generator of my invention may be installed to replace prior generators without the need of extensive modification of pre-existing engine arrangements.

SUMMARY OF THE INVENTION

In a principal aspect, a magnetic signal generator constructed in accordance with the principles of my invention includes a rotatable magnetic rotor having a plurality of magnetic poles and a pair of stators each having a plurality of elongated fingers. The fingers of each stator extend between the fingers of the other stator and enclose the rotor. The fingers of one of the stators are connected to a base and a coil is provided having a core connected to the base and to the other stator. As the rotor is rotated, its poles pass the stator fingers and induce an electrical signal in the coil. The signal is conducted from the coil through conductors.

These and other objects, features and advantages of the present invention will be more clearly understood following a consideration of the following detailed description.

BRIEF DESCRIPTION OF THE DRAWINGS

In this description, reference will be frequently made to the attached drawings in which:

FIG. 1 is a partially sectioned elevation view of a preferred embodiment of the magnetic tachometer generator of my invention;

FIG. 2 is an elevation view of an assembled coil, terminal, and one stator;

FIG. 3 is an end view of the assembly of FIG. 2 taken along line 3—3 of that figure;

FIG. 4 is an end view of the rotor;

FIG. 5 is an elevation view of the other stator; and

FIG. 6 is an end of the stator of FIG. 5 taken along line 6—6 of that figure.

DESCRIPTION OF THE PREFERRED EMBODIMENT

Referring to FIG. 1, a preferred embodiment of the magnetic tachometer generator of my invention is shown. The generator includes a base member 10 having a passage 12 extending longitudinally therethrough. The passage 12 carries threads 14 at one end to adapt the generator assembly to be mounted on an engine or the like. A second base member 16 is attached to base member 10 by bolts 18 and a passage 20 extends in axial alignment with passage 12 longitudinally through base member 16. A rotatable shaft 22 is journaled through passage 20 and a drive cable 24 or other suitable driving mechanism is attached at one end to impart rotation to the shaft 22 from the engine. A suitable cylindrical oil seal 26 and a sleeve bearing 28 are provided to mount the shaft 22 for rotation. It should be understood that the bearing arrangement is not deemed to be part of the present invention and thus various bearing arrangements, other than those shown, may be employed.

Attached to the other end of the shaft 22 is a magnetic rotor 30, which is generally circular in cross-section, and is attached to the end of shaft 22 by bolt 32. As best seen in FIG. 4, the rotor 30 carries twelve magnetic poles, six north and six south poles. The rotor may be one of a variety of well known constructions as long as the rotor includes a plurality of spaced north and south poles, the specific rotor construction not being the subject of my invention.

Referring to FIGS. 1, 5 and 6, a cup-shaped stator 34 is provided having a base 36 and a plurality of longitudinally extending fingers 38 integral with the base and extending in a generally perpendicular direction from the base 36. The base 36 abuts the base member 16 and includes an aperture 40 in its center through which the shaft 22 passes. The number of fingers 38 provided on stator 34 is equal to the number of poles of like polarity on the rotor 30. Therefore, since the rotor 30 has six north and six south magnetic poles, the stator 34 has six fingers 38. The ends of the fingers 38 opposite the base are each firmly inserted in a plurality of generally rectangular apertures 42 in a base plate 44, as shown in FIG. 3. The tips of the fingers are preferably split at 46, as best seen in FIGS. 5 and 6, and are inserted into the apertures 42 and staked by bending the tips away from the split resulting in a firm fit.

A second cup-shaped stator 48 is provided also comprising a base 50 and a plurality of fingers 52 integral with the base 50 and extending generally perpendicular to the base 50. The fingers 52 of stator 48 are shorter than the fingers 38 of stator 34 and extend in a direction opposite to the fingers 38. The fingers 38 and 52 of each of the stators are disposed between each other forming a generally cage-like structure enclosing the rotor 30.

A conductive wire coil 54, formed on a nylon bobbin 56, is fitted over a core 58. One end of the core 58 is inserted through an opening 60 in the base 50 of stator 48 and may be peened over or the like at 62 to firmly affix the core 58 to the stator 48. The other end of the core 58 extends through the base plate 44 and also may be peened over or the like at 64, as shown in FIG. 2, to firmly affix that end of the core to the base plate 44. Thus, the coil 54, stator 48, and base plate 44 form an integral assembly, as shown in FIG. 2.

The fingers 38 and 52 of stators 34 and 48 respectively, are spaced from each other by such a distance that all the poles of like polarity of the rotor 30 will be aligned with fingers 38 when all the poles of opposite polarity are aligned with fingers 52.

A pair of electrical terminals 68 and 69 are provided comprising bolts 71 and 72 extending through base plate 44. The terminals are insulated from the base plate by suitable non-conductive washers 74 and 75. Conductor tabs 77 and 78 are secured between non-conductive washers 75 and lock washers 79 and one end 80 of the wire turn of coil 54 is connected to tab 77 and the other end 81 to tab 78, the ends 80 and 81 of the wire turn extending through apertures 82 in the base plate 44. The washers 74 and 75, tabs 77 and 78, lock washers 79, and base plate 44 are rigidly secured in sandwiched relationship by nuts 84 threaded on terminal bolts 71 and 72.

The signal generating assembly is enclosed by a cover 86 to prevent dirt and undesirable foreign matter from entering the assembly. One end of the cover 86 is slipped over and encircles the base member 16 and an O-ring 90 about the circumference of the base member 16 seals the cover to the base member and securely holds the cover in place by friction. Terminal bolts 71 and 72 extend through the end of the cover 86 and nuts 92 and washers 93 on the terminals mount the stator and coil assembly to the cover 86 and adapt the terminals for receiving conductor leads for the transmission of the electric signal generated in the coil 54 to a suitable tachometer or other signal indicating device.

When the engine or other machine is operating, its rotation will be imparted to shaft 22 via the drive cable 24. As the shaft 22 rotates the rotor 30 will be rotated, causing its poles to pass the fingers 38 and 52 of stators 34 and 48, respectively. Since the fingers 38 and 52 of stators 34 and 48 are spaced such that all the fingers of one stator will be aligned with all the north poles of the rotor 30 when all the fingers of the other stator are aligned with the south poles of rotor 30, the north poles of rotor 30 will first pass the fingers 38 of stator 34 and then pass the fingers 52 of stator 48 as the rotor rotates. As the poles of the rotor pass the respective stator fingers, the magnetic lines of flux produced by the poles are cut by the fingers causing a magnetic flux be induced in each of the stators 34 and 48. For example, as the north poles pass the fingers 38 of stator 34, a magnetic flux will be induced in the stator fingers 38 and the flux passes through the base plate 44, the coil core 58 and into the base 50 and fingers 52 of stator 48, the latter stator having an opposite polarity concurrently induced by the simultaneous passage of the south poles of the rotor past the fingers 52 of stator 48. As the north poles pass the fingers 52 of stator 48, the magnetic flux will reverse passing through the fingers 52 of stator 48, base 50, coil core 58, base plate 44, and the fingers 38 of stator 34. The changing magnetic flux will induce an electrical signal voltage in coil 54. Since the rotor 30 has twelve poles and each of the stators has six fingers, the magnetic flux change and the resulting signal voltage induced in the coil 54 will be sine wave in form and will reverse direction every 30° of rotor rotation, completing a cycle every 60°. The electrical signal is conducted from the coil 54 through the coil wire ends 80 and 81 and tabs 77 and 78, and is led through terminals 68 and 69 to operate a tachometer or other suitable indicating device connected across the terminals.

It will be readily appreciated when considering the description of the preferred embodiment of the invention, that the magnetic generator constructed in accordance with the principles of my invention eliminates the need for brush-type contacts and obviates the inherent disadvantages of the prior signal generators. Since no elements of the signal conducting circuitry are in moving contact with each other, "point bounce" is eliminated and an extremely durable and reliable generator is provided. Moreover, the generator of my invention is not readily subject to faulty operation due to contamination, vibration or temperature extremes.

It is to be understood that the embodiment of the invention which has been described is merely illustrative of an application of the principles of the present invention. Numerous modifications may be made by those skilled in the art without departing from the true spirit and scope of the invention.

What is claimed is:
1. A magnetic signal generator comprising:
   a first stator having a base and a plurality of elongated spaced fingers extending substantially perpendicular to said base,
   a second stator having a base spaced from the base of said first stator and a plurality of elongated spaced fingers extending substantially perpendicular to the base of said second stator, the fingers of each of said stators extending between each other and in opposite directions and the fingers of said second stator being substantially shorter than the fingers of said first stator,
   a magnetic rotor mounted for rotation on a drive shaft which extends through the base of said first stator, said rotor being positioned between the bases of said stators and surrounded by the fingers of said stators,
   plate means spaced from the bases of said stators, the ends of the fingers of said first stator opposite its base being attached to said plate means,
   a magnetic core attached to and extending between said plate means and the base of said second stator, said core being substantially coaxial with said drive shaft but axially spaced therefrom adjacent said rotor, and
   a coil means mounted on said core between said plate means and the base of said second stator for generating an alternating electrical signal when said rotor is rotated.

2. The signal generator of claim 1 further comprising:
   a housing enclosing said first and second stators, said rotor and said coil means, said first stator abutting one end of said housing, and said drive shaft extends through said one end of said housing,
   conductor means including electrical terminal means extending through the end of said housing opposite said one end, said terminal means being electrically connected to said coil means, and
   said plate means is mounted on said terminal means to urge said first stator toward said one end of said housing and mount said second stator and said coil means.

References Cited

UNITED STATES PATENTS

| | | | |
|---|---|---|---|
| 2,692,957 | 10/1954 | Clark et al. | 310—156 |
| 3,366,067 | 1/1968 | Kocolowski | 310—18 XR |
| 3,268,751 | 8/1966 | Nebiolo et al. | 310—156 |
| 3,007,625 | 11/1961 | Dolz | 310—18 XR |
| 2,981,855 | 4/1961 | Lieshout et al. | 310—156 XR |
| 3,272,931 | 9/1966 | Rulseh | 310—164 XR |

MILTON O. HIRSHFIELD, Primary Examiner

B. A. REYNOLDS, Assistant Examiner

U.S. Cl. X.R.

310—70, 257; 324—70